March 21, 1939. C. P. GRIFFITH 2,151,201
THERMOSTATIC CONTROL FOR FLUID METERS
Filed June 24, 1936
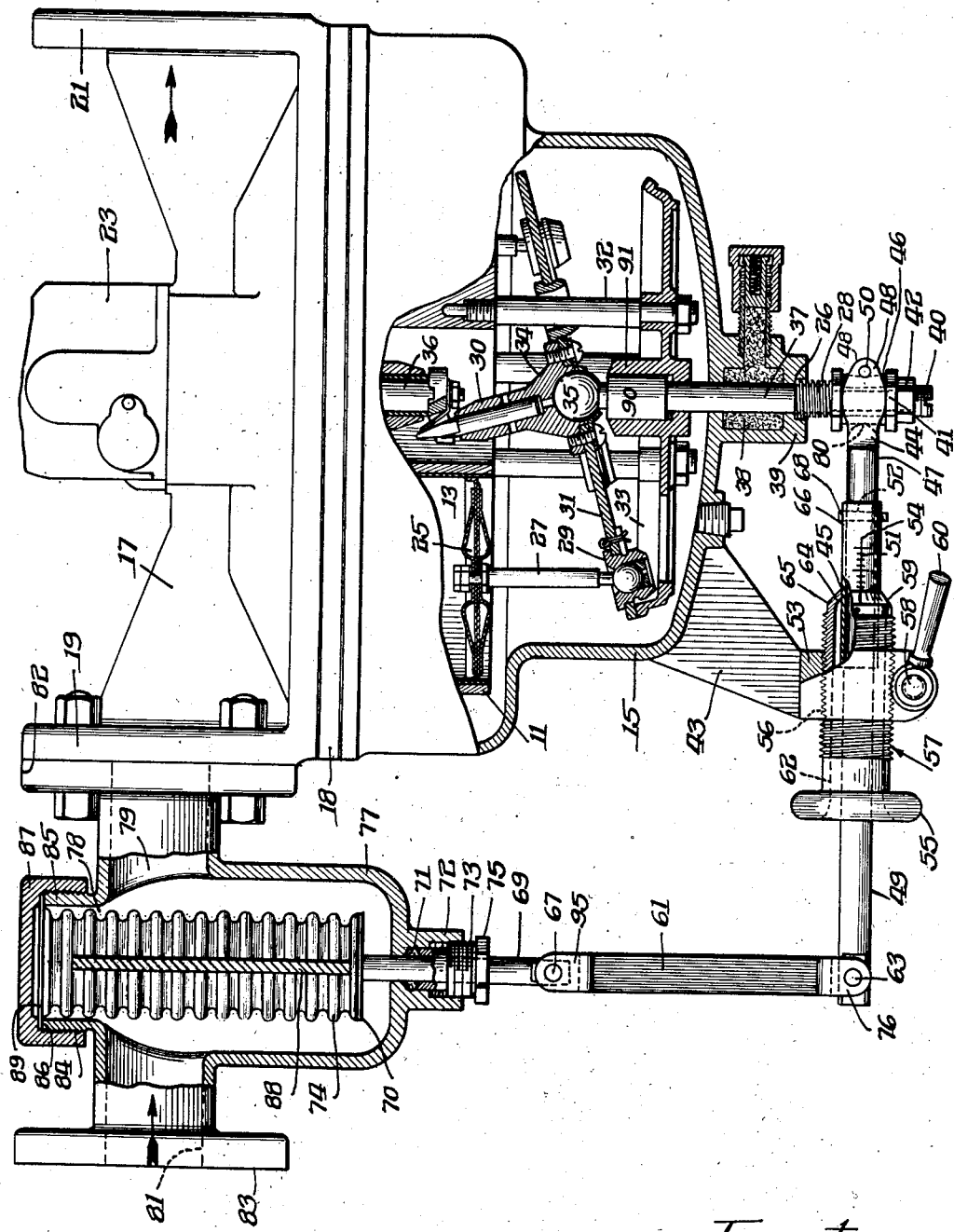
Inventor:
Clement P. Griffith
By: Cox & Moore
attys.

Patented Mar. 21, 1939

2,151,201

UNITED STATES PATENT OFFICE 2,151,201

THERMOSTATIC CONTROL FOR FLUID METERS

Clement P. Griffith, Fort Wayne, Ind., assignor to S. F. Bowser & Company, Incorporated, Fort Wayne, Ind., a corporation of Indiana Application June 24, 1936, Serial No. 86,935

8 Claims. (Cl. 73—232)

The objects of the invention briefly stated are as follows:

To provide a thermostatic control mechanism for displacement meters which is adjustable to enable one thermostatic element to be used with fluids having different coefficients of cubic expansion.

To provide a thermostatic control mechanism which may be quickly and accurately adjusted by an operator to correct for the varying coefficients of expansion of the various fluids to be measured.

To provide a thermostatic meter control device which requires operation of only one adjustment means when the nature of the fluid to be measured is changed.

To provide a thermostatic meter control mechanism which is provided with a single, easily understood adjusting mechanism.

To provide a thermostatic control device which will permit the meter to displace a substantially fixed quantity of fluid at a standard temperature regardless of whether the coefficient of expansion adjustment is set for the fluid being measured or not.

To provide an adjustment mechanism for a thermostatic meter control device which covers a wide range of coefficients of expansion accurately and finely with comparatively small displacement of the adjustment mechanism.

To provide a thermostatic meter control device which, when it is applied to the meter, in no way interferes with the calibration of the meter when it is initially tested.

Other objects will appear from a consideration of the specification in connection with the accompanying drawing.

The drawing discloses an elevation partly in section showing the thermostatic control mounted in operative relation with a displacement meter.

In the preferred form shown in the drawing, 11 represents the cylinder block of a well-known type of displacement meter, the construction of which is clearly shown and described in the patent to H. L. Blum, No. 1,977,424. Cylinders 13, only one of which is shown, are formed in the block, and the block and cylinders are encased in a bowl 15 and a cover 17 which are joined with flange 18 formed on the block by means of bolts, to form a complete housing for the working elements of the meter.

Pistons 25 work in the cylinders and are mounted on the ends of piston rods 27 which at their opposite ends are seated in bearings 29 carried by a circular "wabble" or nutating plate 31, which at its periphery rides upon a circular rail or track 33 suspended from the cylinder block by means of shouldered studs 32. The nutating plate is provided with a bearing 34 which is supported upon a ball 35 mounted upon an axially movable shaft 37. The shaft passes through the track support and is passed through the bottom of bowl 15 by means of a packing box 39 containing plastic packing 38. Any other suitable fluid sealing arrangement may obviously be utilized, so long as it permits axial motion of shaft 37. A bearing 91 in track 33 guides journal 90 of said shaft in its axial movement.

Bearing 34, mentioned above, carries an extension 30, which cooperates with a crank fixed on shaft 36 to rotate the same. This rotation of the shaft is communicated to the valve mechanism (not shown) which controls the flow of fluid to and from the cylinders and it is also communicated to the registering mechanism 23 mounted on cover 17 which registers the volume of fluid passing through the meter.

The end of shaft 37 which projects outside of bowl 15 is provided with a thread 40 which receives an internally threaded collar 41 and a jam nut 42. The collar is grooved as at 46 to receive the arms of a clevis as will be later described. A screw threaded connection between the collar and shaft 37 is provided so that adjustment between these parts may be effected when the meter is calibrated and the jam nut, of course, serves to maintain the adjusted relationship of collar and shaft. A spring 28 is confined between the collar and a seat 26 formed in the bottom of the stuffing box 39 and is of such proportions as to be under a suitable degree of compression at all times. This construction serves to prevent lost motion in the linkage to be described below from affecting the adjustment of the meter and to insure that the meter responds to adjustments made in the linkage.

An arm or web 43 is attached to and depends from the meter bowl 15 and carries, at its lower extremity, a boss 53 which is provided with a cylindrical internally threaded bore 56. The boss is slotted parallel with the axis of the bore and a clamping screw 58 passes through one wall of the slot and is in threaded engagement with the opposite wall and when said screw is drawn up it tends to close the slot thereby reducing the circumference of the bore. The screw 58 is provided with an operating handle 60.

A cylindrical fulcrum member 57 is provided with external threads which are adapted to cooperate with the internal threads of bore 56 and to be received thereby. The member 57 is provided with an operating hand wheel 55 formed integrally therewith and by means of which adjustment of the member with respect to the boss may be readily accomplished. At the opposite end of member 57 is a knife edge 45 which is formed by a cylindrical bore 62 in the member which terminates in a frusto-conical bore 64 and by a frusto-conical surface or taper 65 on the outside of said fulcrum member. The external taper 65 is provided with one scale 59 of a micrometer mechanism later to be described.

A lever, comprising arms 47 and 49 which extend from fulcrum 45 respectively toward and away from shaft 37, is provided with a sleeve 66 slidably mounted thereon and held in place by a pin 68 adapted to be received in opposed openings in the sleeve and in a perforation 52 in the arm 47. The sleeve 66 is provided with a scale 51 which is the second scale of the micrometer mechanism mentioned above and with an indexing mark 54 for said first scale 59. The numerals on scale 51 increase in value from left to right because, as stated at page 3, lines 27 to 32, the high coefficients of expansion are charted against the low numbers of the scale. It is obvious that other systems of charting may be used and that the scales would have to be modified accordingly. Arm 47 carries on the end nearest shaft 37 the already mentioned clevis 44 which is provided with two arms 48 adapted to be received in the groove 46 of collar 41. It will be noted that the curvature of the arms 48 is such that point of contact between the arms and the collar does not vary as the angularity between lever 47 and the shaft 37 changes. A pin 50 passes through perforations in arms 48 of clevis 44 and serves to maintain lever 47—49 against axial motion. The internal wall of clevis 44 lying opposite pin 50 is curved as shown at 80 so that there will be no binding of shaft 37 between the clevis and pin 50 as the lever 47—49 tilts.

It will be noted that the bore 62 in the fulcrum element is of sufficient diameter to permit lever 47—49 to rock through its entire range of motion.

Scale 59 extends completely around the circumference of the tapered surface of the fulcrum element and its graduations divide said surface into 25 equal spaces which are numbered, as shown, at every fifth graduation. Since the zero and the twenty-fifth graduations are coincident only the character "0" is placed on the scale. The longitudinal scale 51 comprises equidistant parallel graduations numbered consecutively from right to left at every fourth graduation. The thread on fulcrum member 57 is such that when hand wheel 55 is turned to advance the numbers on scale 59 past index 54, the fulcrum will advance to cover scale 51, one revolution of scale 59 serving to cover the space between two adjacent graduations on the scale 51.

The scales are so arranged that when the zero graduation of scale 59 coincides with index 54, the small end of the frustum will split one of the graduations on scale 51. Thus, it will be seen that the space between adjacent graduations of scale 51 is accurately divided into 25 equal parts by means of scale 59 and index 54.

At the end farthest from fulcrum 45, lever 49 is provided with a perforation adapted to receive a pin 63 which serves to connect said lever with a yoke 76 on a link 61, the upper end of which is provided with a yoke 95 for a purpose to be later described.

A hollow T-shaped body indicated generally by the numeral 77 is provided with an inlet flange 83 having a port 81 which is adapted to be connected to the fluid conduit leading to the fluid reservoir or other source of supply such as a pump. The body is also provided with an outlet port 79 which is connected by means of a flange 82 to the inlet side 19 of the meter. An upper central opening 78 in the body is provided with an encircling flange 85 having a flat annular surface 86. A cap or closure 87 is provided for the opening and may be held in place by the cooperation of a screw thread 84 on the exterior of the flange with an internal thread in the cap. An end plate 89 of an expansible, fluid containing bulb or Sylphon 74 is confined between the annular face 86 and the cap 87. Thus the flange and cap cooperate to support the expansible bulb in position and to anchor one end of the bulb so that all of the motion resulting from expansion of the Sylphon will be imparted to the lower or active end thereof. The arrangement described permits inspection of the body and facilitates the assembly of the Sylphon therein, and at the same time serves to seal the body against loss of liquid therefrom while the device is in operation.

A baffle 88 extending transversely of the flow of fluid through body 77 and longitudinally of the latter and in close proximity to the Sylphon is provided on each side of the Sylphon to insure intimate contact between the fluid flowing through the body and the Sylphon.

To the other plate 70 of the bulb is attached an axially movable rod 69 which is passed through the housing 77 by means of a packing box 72. Packing represented by the reference character 71 is held in the box under pressure by means of a packing gland 73 which is threaded into the box 72. A hexagonal flange 75 is provided on the gland to enable adjustment thereof in or out of the box to be accomplished.

The lower end of rod 69 is provided with a pin 67 which is received in an opening in the yoke 95 of the above mentioned link 61. Thus, it will be seen that any motion of the end plate 70 of the bulb 74, due to expansion or contraction of the bulb will be transmitted through the rod 69 to link 61 and from this link through pin 63 to lever 47—49. The motion of lever 47—49 is imparted to shaft 37 to raise or lower bearing 34 of the nutating plate with respect to rail 33. It is obvious that such adjustment of the bearing 34 will alter the angle which the plane of the nutating plate makes with the plane of rail 33 and consequently it follows that the stroke of the pistons will be increased or diminished depending upon whether the angle is increased or decreased. Since the displacement of the pistons is a direct function of their stroke, the displacement will increase with the increase of stroke while the angular velocity of the shaft 36 and the speed of the register 23 remain unchanged by the adjustment. It will be seen that this provision for adjustment of the displacement of the pistons without affecting the angular motion of shaft 36 or operation of register 23 enables corrections to be made for certain factors now to be discussed aside from the calibration of the meter.

It is a well recognized fact that fluids of different kinds expand with an increase of temperature and contract with a decrease of temperature and that the amount of expansion and contraction is different for different fluids. The change in volume for each degree change of temperature has been carefully studied with respect to a great variety of fluids and the results have been compiled into tables of coefficients of cubic expansion and contraction for the various fluids.

If we suppose that the meter described above was originally calibrated to indicate one gallon on the register 23 when the pistons have displaced 231 cubic inches of fluid at a given temperature, as for instance, sixty degrees Fahrenheit, and if the same meter were used to measure the same fluid at, for instance, seventy degrees Fahrenheit, and this fluid had a coefficient of expansion of .001 cubic inch per degree Fahrenheit, the measured fluid when it had cooled to sixty degrees would occupy only 231—(231×.001×10)=228.69 cubic inches. It is obvious, therefore, that the volumetric displacement of the meter must be increased by 2.31 cubic inches so that when the liquid is cooled to the standard temperature of 60 degrees, the volume of the liquid will be the required 231 cubic inches and will correspond with the amount indicated on the register as having been dispensed.

As noted above, the increase of displacement is accomplished by raising the bearing 34 with respect to the rail 33 and the latter function is performed by the mechanism described below.

From an inspection of the drawing it will be apparent that fluid flowing to the meter must first contact the bulb 74. It follows that the adjustment of the meter is controlled by the temperature of the incoming fluid rather than the measured fluid. Such an arrangement is provided because the temperature of the incoming fluid tends to correspond more nearly to the temperature of that in the cylinders than does the measured fluid which fills the bowl 15 and which, consequently, has had an opportunity to lose some of its heat. Obviously, however, in some cases the difference in temperature between the incoming and outgoing fluids would be so small as to render it immaterial whether the Sylphon mechanism is attached to the meter at its inlet or its outlet port.

The form and arrangement of the different parts of the thermostatic control mechanism is such that it may be readily applied to either port of the meter without any changes or adjustments being made aside from recalibration.

The Sylphon or bulb is filled with a liquid whose expansion per degree of change of temperature is accurately known. Such liquid may be kerosene or any other suitable material.

A further inspection of the drawing discloses that when the temperature of incoming fluid is higher than that of the liquid in the Sylphon, the latter will expand a definite amount which depends upon the difference of temperatures, to depress arm 49 and raise arm 47. This motion of arm 47 is imparted to bearing 34 to increase the volumetric displacement of the pistons, as described above, to compensate for the expanded condition of the high temperature fluid. If the incoming fluid is cooler than the liquid in the bulb, the latter will contract and cause bearing 34 to be lowered to reduce the volumetric displacement of the pistons to compensate for the contracted condition of the low temperature fluid.

The same bulb and entrapped liquid will be used in connection with the meter for measuring all fluids which the meter is adapted to handle. It will be noted then, that this bulb will have the same amount of expansion or contraction per degree of temperature change without regard to the varying coefficients of expansion of the different fluids. It is, therefore, necessary to provide means for modifying the motion imparted by the bulb to the bearing 34 to correspond to the coefficient of expansion of the particular fluid being measured and for this reason the micrometric adjustment described above is provided. It will be noted that the vertical motion of the rod 69 is transmitted to lever arm 49 and thence to lever arm 47, hence if we adjust the effective lengths of arms 47 and 49, a greater or less motion will be given shaft 37 in response to the given motion of rod 69. To accomplish the adjustment, the fulcrum is shifted right or left as may be necessary, by turning hand wheel 55. Such motion serves to lengthen one of the arms 47, 49 and at the same time serves to shorten the other, thereby changing the ratio of the lengths of the arm. Thus, any motion imparted to arm 49 will be modified in accordance with the existing ratio as it is transmitted to the adjusting bearing of the meter. For example, if the fulcrum is adjusted to entirely cover scale 51 the lever 47 will be of minimum length, while lever 49 will be of maximum length. Consequently, a given motion of rod 69 will produce smaller motion of shaft 37 than if the fulcrum is adjusted to entirely uncover scale 51. The calibration of the micrometer mechanism may readily be accomplished by charting the high coefficients of expansion against the low numbers of the scale reading and the low coefficients against the high numbers of the scale reading.

To illustrate this fact, if we assume that a fluid with a high coefficient of expansion is being measured, it will be seen that the displacement of the meter must be increased with respect to the reading of the register to compensate for the relatively large expansion of the fluid. Consequently, motion of the fulcrum toward the left, which serves to increase the ratio of the length of arm 47 to that of arm 49 and serves thereby to give a relatively greater effect to the motion of rod 69 caused by a specified change in temperature of the liquid, will be necessary to accomplish the required increase in meter displacement. The range of coefficients covered by the adjustment mechanism is wide due to the fact that the shiftable sleeve 66 may be positioned at any point along the lever within range of the threaded fulcrum member 57.

It will be seen that by reason of scale 51 being mounted on a removable sleeve, the scale may be changed by substituting a sleeve 66 having a different scale. Also the movability of said scale relative to lever 47 permits ready assembly of the scale in correct position on each individual meter as it is calibrated so that the scales will read accurately in spite of the characteristics of the individual meters. Such an arrangement permits the individual meters to be adjusted to a standard chart instead of requiring that a chart be constructed for each meter. For example, when a meter is, by adjustment of the fulcrum member, made to discharge the theoretical amount of fluid at a certain temperature and having a given coefficient of expansion, and the scales should read .150, the scale 59 will be adjusted so that the zero graduation is coincident with the index 54. Next the scale 51 will be displaced along lever 47 until the indicating portion of the taper 65 splits the graduation which lies midway between the numerals 1 and 2 on scale 51 the index 54 and the zero graduation on scale 59 being maintained in alignment. In this position the hole 52 is drilled through the scale and arm 47 and the pin 68 is inserted to maintain the scale in its adjusted position.

The selected position of fulcrum element 57 is maintained by tightening the split boss about the element. This is accomplished by operation of screw 58 by means of lever 60 described above.

It will be seen that once the position of the fulcrum is established to correct for the coefficient of expansion of a liquid to be measured, changes of more than one degree in temperature will be cared for by a corresponding additional motion of the Sylphon or bulb which necessarily responds in direct proportion to the amount of the change in temperature.

In view of the fact that the operator is to be freed, by this invention, from the duty of keeping check upon the temperature of the fluid being measured, it is necessary that the control mechanism be so designed that at a "standard" temperature, which may be sixty degrees Fahrenheit or any other preselected temperature, the adjustment of the displacement elements of the meter will be the same for all fluids to be measured by the meter. Therefore, the design of the control mechanism must be such that the coefficient of expansion adjustment may be moved through its full range of adjustment without affecting the adjustment of the displacement elements when the thermostatic Sylphon occupies its "standard" temperature position. To accomplish this object, the design of the control mechanism is such that at the "standard" temperature, the lever 47—49 occupies a substantially horizontal position so that adjustment fulcrum 45 will have no tendency to rotate the lever as would be the obvious tendency if the lever occupied an angular position. Also, the link 61 is substantially perpendicular to the lever and this enables it to produce a maximum effect upon the lever for any motion of rod 69 and this consequently reduces the range of adjustment of the fulcrum necessary to cover a given range of coefficients to a minimum. A further advantage of the perpendicular relationship of link 61 with lever 47—49 is that in this position the lateral displacement of the lower end of the link to the angularity of arm 49 as it is displaced from the horizontal, will be minimum. In fact, the displacement will be minute because of a small arc through which the arm 49 travels in its maximum travel.

Attention is also directed to the fact that shifting the fulcrum changes the lengths of the arms 47, 49 simultaneously by adding an amount to the length of one and subtracting the same amount from the other. Thus it will be seen that the range of adjustment in the ratio of the arms is a maximum for a given displacement of the adjusting means. Even though the range of adjustment of the fulcrum to provide the necessary change in lever ratio has been reduced to a minimum, the range of fulcrum adjustment is accurately and finely adjusted by the provided micrometer mechanism.

In practice, the operators of the machines are provided with charts which have listed by name all of the fluids which the meter is adapted to measure, or instead of names, specific gravities or Baumé gravities may be listed. In a second column on the level with each name or gravity indication is listed the number which represents the setting of scales 51 and 59 required to provide the proper leverage relation to adjust for the coefficient of cubic expansion of the fluid. Assuming that the meter has been adjusted by means of collar 41 and nut 42, so that when it has delivered 231 cubic inches of a fluid which is being passed through the meter at a standard temperature as for instance sixty degrees Fahrenheit, the register 23 indicates one gallon; if the operator now desires to measure gasoline which has a larger coefficient of cubic expansion, he will consult his chart and opposite the word "Gasoline" or the gravity indication corresponding to the gravity of the gasoline to be measured he will find certain figures which we will assume are .36. Since the first line to the right of the zero on scale 51 represents a quarter unit or .25, the operator will rotate hand wheel 55 to cover this line and continue to rotate the hand wheel to further cover the scale 51 until the number 10 on scale 59 passes and the next line on this scale falls opposite index 54. Thus the operator will have adjusted the effective lengths of arms 47 and 49 by adding to arm 49 an amount represented by the figures .25+.11=.36 and by subtracting from arm 47 a similar amount which was indicated by the chart. The meter, as thus set will still deliver 231 cubic inches of fluid at a temperature of sixty degrees Fahrenheit, but if the temperature of the fluid is other than sixty degrees the Sylphon, acting upon the adjusted lever arm 49 will automatically cause proper adjustment of the piston displacement so that when the liquid discharged by the meter to cause the register to indicate one gallon, is brought to a temperature of sixty degrees Fahrenheit, it will occupy a volume of 231 cubic inches.

Having thus fully disclosed an embodiment of my invention, what I desire to secure by Letters Patent of the United States is:

1. In combination with a meter which is adapted to dispense fluids having varying cubic expansion properties, means for varying the amount of fluid dispensed by the meter during a cycle of operation, a device adapted to move a predetermined distance in response to a predetermined change in temperature of the fluid being dispensed, means for imparting the movement of the temperature responsive device to said varying means and manually operable means for adjusting said last named means in accordance with the cubic expansion property of any fluid which the meter is adapted to measure.

2. In a control for a fluid dispensing meter, means for adjusting the quantity of fluid discharged by the meter during one cycle, a thermostatic element arranged to be subjected to the temperature of the fluid being dispensed, means connecting said element with said adjusting means to vary the meter discharge in accordance with the temperature, said connecting means including a double armed lever and means for adjusting the ratio of the lengths of said arms in accordance with the cubic expansion characteristic of the fluid being measured.

3. In a liquid dispensing mechanism, a meter, a device which moves in accordance with the change of temperature of the liquid being dispensed, a lever adapted to be moved by the device, means for micrometrically adjusting the relative lengths of the arms of the lever to modify the movement produced by said device in accordance with the cubic expansion property of the liquid being dispensed, means for locking said adjusting means in adjusted position and means connected with said lever to change the amount of liquid dispensed during a cycle of the meter in proportion to the magnitude of said modified movement.

4. In a liquid dispensing meter, a thermostatic device which moves when the temperature of the liquid being dispensed changes, a lever of the first class connected to said device, a knife edge for supporting said lever, means for adjusting said knife edge with a fine degree of accuracy to modify the resultant motion of said lever to compensate for the cubic expansion of the liquid being measured, means connected with said lever for modifying the amount of liquid dispensed by said meter during a cycle in accordance with the resultant motion of said lever.

5. In a control device for a fluid meter, an expansible and contractible thermostatic element, means for insuring contact between the element and the fluid being dispensed, a linkage including a lever having an adjustable fulcrum connected to said element, means connected to said lever for adjusting the volume of fluid dispensed by the meter during a cycle, said linkage being arranged so that lost motion therein will be taken up in one direction as said thermostatic element expands and means for retaining said lost motion in the same direction as said thermostatic element contracts.

6. In a control device for a liquid dispensing meter, an element which changes its length in response to temperature changes, means whereby said element is subjected to changes in temperature of the liquid being dispensed, a linkage adapted to receive motion from said element as it changes length, a support attached to the meter, a fulcrum element adjustably mounted in said support, a lever in said linkage adapted to rest on said fulcrum, means for finely adjusting said fulcrum with respect to said lever, means for maintaining said adjustment, means for varying the amount of liquid displaced by the meter during a cycle of operation, connections between said lever and said varying means whereby said varying means is adjusted to correct the amount of liquid displaced for the expanded or contracted state thereof.

7. In a control device for a fluid dispensing meter, means movable to occupy various positions responsive to the temperature of the fluid being dispensed, means for adjusting the discharge of said meter in accordance with the position of said movable means, said adjusting means including an adjustment mechanism to compensate for the expansion characteristics of the fluids to be measured and an adjustment mechanism whereby the meter may be calibrated independently of said movable means.

8. In a control device for a liquid dispensing meter, temperature responsive means for adjusting the volume of liquid discharged by said meter per cycle in accordance with the temperature of the liquid, means for adjusting the volume of liquid discharged by the meter in a cycle in accordance with the cubic expansion characteristics of the liquid being measured, both means cooperating to regulate the volume of any liquid discharged in a cycle by the meter so that when they are reduced to a predetermined temperature they will occupy the same volume despite differing cubic expansion characteristics and varying temperatures at which they passed through the meter.

CLEMENT P. GRIFFITH.